June 21, 1927.

P. A. CALDWELL 1,633,394

ATTACHMENT FOR CULTIVATORS

Filed Oct. 24, 1925    2 Sheets-Sheet 1

Inventor
P. A. Caldwell
By
Attorney

June 21, 1927.
P. A. CALDWELL
1,633,394
ATTACHMENT FOR CULTIVATORS
Filed Oct. 24, 1925  2 Sheets-Sheet 2
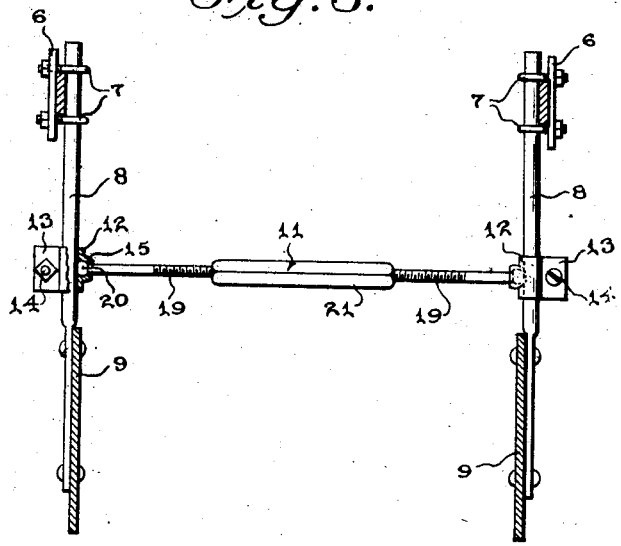
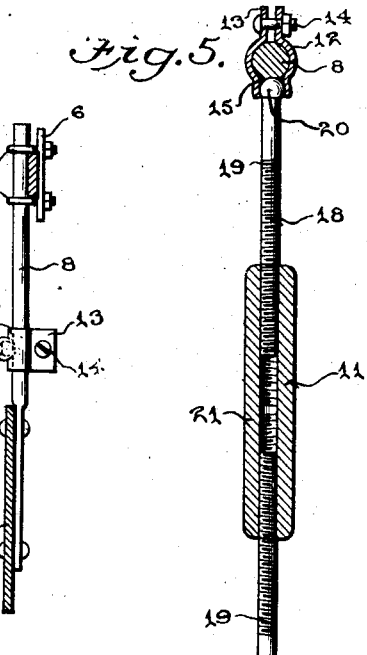
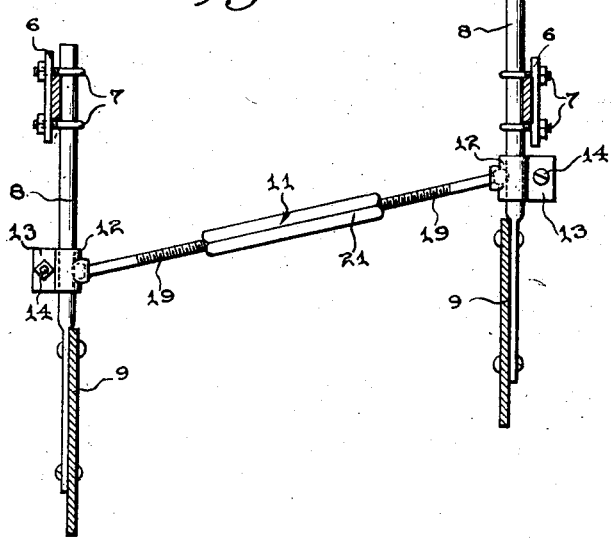
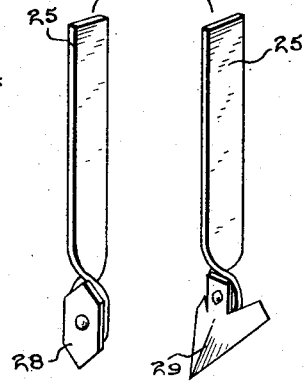
Inventor
P. A. Caldwell Patented June 21, 1927.

1,633,394

UNITED STATES PATENT OFFICE.

PAUL A. CALDWELL, OF TELL, TEXAS.

ATTACHMENT FOR CULTIVATORS.

Application filed October 24, 1925. Serial No. 64,621.

The purpose of the present invention is to provide, in an attachment for cultivators, opposed parallel runners with means whereby the runners are permitted to be adjusted vertically with relation to supporting bars which, in turn, are suspended from a cultivator frame.

Another purpose is to provide upstanding shanks carried by the runners, with universal connections between the opposed shanks of the opposed runners for holding the runners in parallelism or in relative fixed positions.

Still another purpose is to provide a construction and arrangement of such universal connections as to permit one runner to be raised independently of the opposite runner, the shanks of the runners being clamped to the bars of a beam which is suspended from the cultivator frame.

A further purpose is to provide rearwardly extending bars carried by the rear ends of the runners, the bars being provided with a plurality of offset portions for carrying shovel or plow blade shanks, the plow blades or shovels acting to work the soil between the rows of plants.

A still further purpose is to provide laterally and rearwardly diverging cutting blades carried by the lower portions of the remote faces of the runners to operate between the rows for the purpose of working the soil and cutting the weeds and other foreign growths, the runners being relatively short in order to relieve the pressure against the lister beds and which will have a tendency to make the cultivator run easily and especially with more comfort to the operator.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 3 is a vertical sectional view on line 3—3 of Figure 1.

Figure 4 is a view similar to Figure 3 but showing the runners one adjusted higher than the other.

Figure 5 is a horizontal sectional view on line 5—5 of Figure 1, more clearly showing the universal connections between the shanks of the runners.

Figure 1:
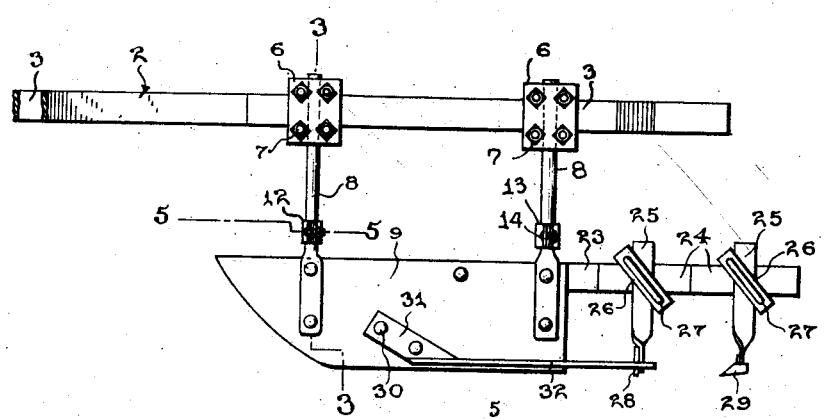
Figure 1 is a view in side elevation of the improved attachment as applied to the frame of a conventional form of cultivator.
Figure 2:
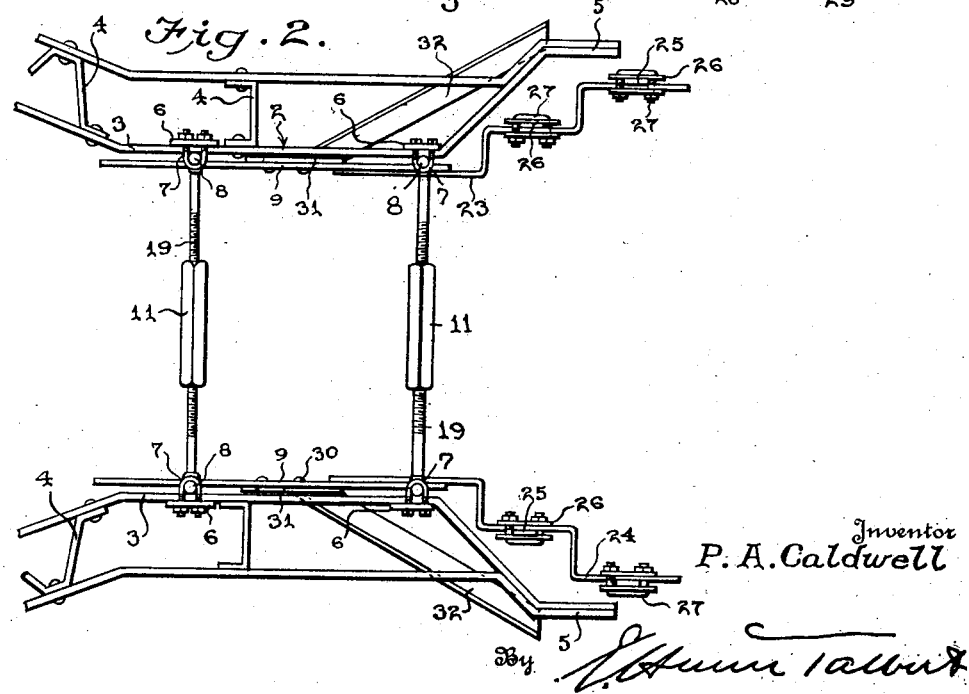
Figure 2 is a plan view.

Figure 6 discloses detail perspective views of two of the shanks carrying shovel and plow blades.

The beam 2, which is designed for suspension from a cultivator frame, comprises opposite bars 3 which are relatively reinforced by the braces 4, the rear ends of the bars merging together, as indicated at 5.

By means of suitable clamping plates 6 and U-bolts 7, depending shanks 8 are supported upon the bars 3. The U-bolts are disposed adjacent the lower and upper edges of the bars 3 and straddle the shanks 8 and pass through the clamping plates 6, there being nuts on the arms of the U-bolts to secure the several parts together and hold the shanks 8 secure and rigid.

However, by loosening the nuts on the U-bolts, it is possible to adjust the shanks vertically, so as to adjust the runners 9 toward and from the bars 3.

In order to hold the runners in rigid parallel positions universal connections 11 are provided between the shanks which carry the runners. Each connection 11 comprises spring sleeves 12 provided with ears 13 and which fit the shanks which extend downwardly from the bars 3. Suitable bolts 14 pass through the ears of the sleeves and have nuts for drawing the sleeves tight.

The adjacent cylindrical portions of the sleeves are provided with openings having adjacent spherical sockets 15. A screw rod 18 consisting of two sections 19 connects the sleeves of opposite shanks. In fact, the remote ends of the two sections of the screw rod have spherical members 20 which seat in the spherical sockets of the sleeves. By such a connection between the sleeves, it is possible to provide for universal movement between the shanks. By adjusting the shanks vertically or forwardly on the bars 3, the universal connections will accommodate themselves to the positions of the runners and by tightening the turnbuckle sleeves 21 which connect the sections of the screw rods, it is possible to hold the runners relatively rigid with respect to each other.

Secured to the runners are rearwardly extending bars 23 which have a plurality of offset portions 24 respectively carrying downwardly extending shanks 25. In fact, the shanks 25 are secured to the bars 23 by means of the clamping plates 26 and U-bolts 27, the U-bolts being disposed so that the shanks 25 will abut with the bolts in order that the shanks will stand the pressure resulting from the plow blades or shovels 28 and 29 operating in the soil.

Also secured by bolts 30 are the forwardly and upstanding portions or arms 31 of the laterally and rearwardly diverging knives 32 which are carried by the remote faces of the runners and are adapted to travel in the soil and cut or uproot the weeds and other foreign growth. The shovels and plow blades operate between the rows of plants, also the rearwardly diverging knives operate between the rows.

The invention having been set forth, what is claimed is:

1. In a cultivator attachment, the combination with a cultivator frame provided with suspended beams, of opposed runners provided with shanks, means for adjustably securing the shanks to the sides of the beams to permit of vertical adjustment of the runners, and means interconnecting the shanks of the runners to rigidly connect the same and adjustable to maintain the parallel relation of the runners irrespective of the horizontal relation of the two.

2. The structure of claim 1 in which the last said means consist of spherical sockets carried by the runner shanks, rods having spherical heads engaging said sockets, the rods being arranged in pairs and reversely threaded, and sleeves threadingly engaged with and connecting said pairs of rods.

3. In a cultivator attachment, the combination with a cultivator frame provided with beams, runners suspended from the beams and mounted for vertical adjustment thereon, adjustable bracing members interconnecting the runners for maintaining parallel relation irrespective of changes in horizontal relation, rearwardly extending bars connecting at their forward ends to the runners and provided with a plurality of offsets, and soil working implements having shanks secured to said offsets to dispose said implements one laterally of the other.

In testimony whereof he affixes his signature.

PAUL A. CALDWELL.